United States Patent

Horner et al.

Patent Number: 5,274,995
Date of Patent: Jan. 4, 1994

[54] APPARATUS AND METHOD FOR ATOMIZING WATER IN A COMBUSTOR DOME ASSEMBLY

[75] Inventors: Michael W. Horner, West Chester; Edward E. Ekstedt; Thomas C. Campbell, both of Cincinnati; Gilbert H. Badeer, Loveland, all of Ohio

[73] Assignee: General Electric Company, Cincinnati, Ohio

[21] Appl. No.: 874,150

[22] Filed: Apr. 27, 1992

[51] Int. Cl.$^5$ .............................. F02C 3/30; F23R 3/36
[52] U.S. Cl. ........................................ 60/39.55; 60/737
[58] Field of Search ............... 60/39.55, 39.05, 743, 60/737, 748, 39.59

[56] References Cited

U.S. PATENT DOCUMENTS

| | | | |
|---|---|---|---|
| 3,853,273 | 12/1974 | Bahr et al. | 60/748 |
| 3,866,413 | 2/1975 | Sturgess | 60/748 |
| 3,899,884 | 8/1975 | Ekstedt | 60/748 |
| 3,946,552 | 3/1976 | Weinstein et al. | 60/743 |
| 4,198,815 | 4/1980 | Bobo et al. | 60/737 |
| 4,214,435 | 7/1980 | Campbell | 60/39.59 |
| 4,216,652 | 8/1980 | Herman et al. | 60/748 |
| 4,222,230 | 9/1980 | Bobo et al. | 60/39.36 |
| 4,271,675 | 6/1981 | Jones et al. | 60/737 |
| 4,373,342 | 2/1983 | Willis et al. | 60/748 |
| 4,584,834 | 4/1986 | Koshoffer et al. | 60/748 |
| 4,653,278 | 3/1987 | Vinson et al. | 60/748 |
| 4,854,127 | 8/1989 | Vinson et al. | 60/743 |
| 4,974,416 | 12/1990 | Taylor | 60/748 |
| 5,123,248 | 6/1992 | Monty et al. | 60/748 |

Primary Examiner—Richard A. Bertsch
Assistant Examiner—Timothy S. Thorpe
Attorney, Agent, or Firm—Jerome C. Squillaro; James P. Davidson

[57] ABSTRACT

A combustor dome assembly having a venturi and an auxiliary wall concentric with the venturi to provide an annular passage for channeling or directing a high velocity air jet from a swirler to a combustion chamber associated with a downstream end of the venturi, thereby facilitating the atomization of a film of water flowing along an inner surface of the venturi and out of the downstream end. In an alternative embodiment, a deflector is used (instead of the auxiliary wall) to direct the air flow towards the downstream end. The downstream end of the venturi may have a curved edge to permit the film of water flowing along an inner surface of the venturi to turn substantially perpendicular to the air flowing past the downstream end of the venturi which further enhances atomization of water. The venturi may also comprise a flange which is positioned in operative relationship with the downstream end for increasing the turbulence at the downstream end. In another embodiment, a plurality of holes are provided in the venturi for permitting natural gas to pass through the venturi and into the annular passage where it can be premixed with swirling air before being introduced to the combustion chamber.

15 Claims, 4 Drawing Sheets

APPARATUS AND METHOD FOR ATOMIZING WATER IN A COMBUSTOR DOME ASSEMBLY

BACKGROUND OF THE INVENTION

1. Field of the Invention

This invention relates to a combustor dome assembly for a gas turbine engine and, more particularly, to an apparatus and method for atomizing water passing out of a downstream end of a venturi in the combustor dome assembly in order to minimize the effects of water erosion on the various components of the combustor dome assembly.

2. Description of Related Art

In the design of gas turbine engines, it has become important to not only provide a combustor apparatus which is efficient, but one which minimizes undesirable emissions as well. One manner of diminishing emissions, such as CO and $NO_x$, involves the injection of water into the combustor to reduce the temperature therein. Typically, the water is supplied through a nozzle circuit in a fuel nozzle which also provides natural gas to the combustor. A swirler coupled to a venturi provides a swirled airflow which causes the water and fuel to mix and swirl in a frusto-conical manner. Some of the water is swirled against an inner surface of the venturi thereby causing a film of water to travel towards a downstream end of the venturi. In combustor designs of the past, the swirling film of water would exit the downstream end of the venturi in relatively large droplets which would project radially outward due to the centrifugal force of the swirling water. It was not uncommon that the water droplets would impact or impinge, for example, the wall of a swirl cup, trumpet, dome plate, rivet band of a combustor dome assembly in the combustor. This water impingement caused thermal distress and erosion to the various components. The cause of thermal distress and erosion to the various components stems from relatively cold water impacting the relatively hot metal surfaces of the swirl cup, trumpet, dome plate, and rivet band.

Thus, while water injection has been effective in combatting emissions, such injection has had the undesirable effect of causing thermal distress and erosion to the swirl cup, trumpet, dome plate and rivet band of the combustor dome assembly.

SUMMARY OF THE INVENTION

Accordingly, a primary object of this invention is to provide a combustor dome assembly comprising a venturi and means associated with the venturi for atomizing water passing out of a downstream end of the venturi, thereby preventing thermal distress and erosion to the various components of the combustor dome assembly housing.

In accordance with one aspect of the invention, this invention comprises a combustor dome assembly for use in a combustion apparatus having at least one combustion chamber, comprising a tubular section having an inlet end and an outlet end, said outlet end being associated with said at least one combustion chamber; a swirler associated with said inlet end, said swirler being capable of receiving a fuel nozzle for supplying fuel and water to said combustion chamber; a venturi having an upstream end coupled to said swirler and a downstream end associated with said combustion chamber; and means associated with said venturi for atomizing water passing out of said downstream end of said venturi.

In another aspect of the invention, this invention comprises a method for inhibiting water erosion damage to a combustion dome assembly of a gas turbine engine, comprising the steps of projecting a swirling charge of fuel and water through a venturi toward a combustion chamber and thereby causing a film of water to travel along an inner surface of said venturi towards a downstream end of said venturi; and atomizing said film of water as it exits said downstream end of said venturi.

Another object of this invention is to provide a combustor dome assembly having means for providing a high velocity air jet towards the downstream end of the venturi.

Another object of this invention is to provide an improved combustor dome assembly design which may improve CO and $NO_x$ emission performance with or without water injection.

Another object of this invention is to provide a trip or flange around an outer surface of a venturi in operative relationship with a downstream end of the venturi in order to create turbulence in the air flowing past the downstream end.

Still another object of the invention is to provide improved means for guiding the water flowing along the inner surface of the venturi to turn radially outward at an angle which is substantially perpendicular to the air flowing past the downstream end of the venturi.

Yet another object of this invention is to provide a venturi having improved means for atomizing water and also having means for enhancing the mixture of fuel and air provided to the combustion chamber.

These advantages, and others, may be more readily understood in connection with the following specification, claims, and drawing.

DETAILED DESCRIPTION OF THE INVENTION

Figure 1:
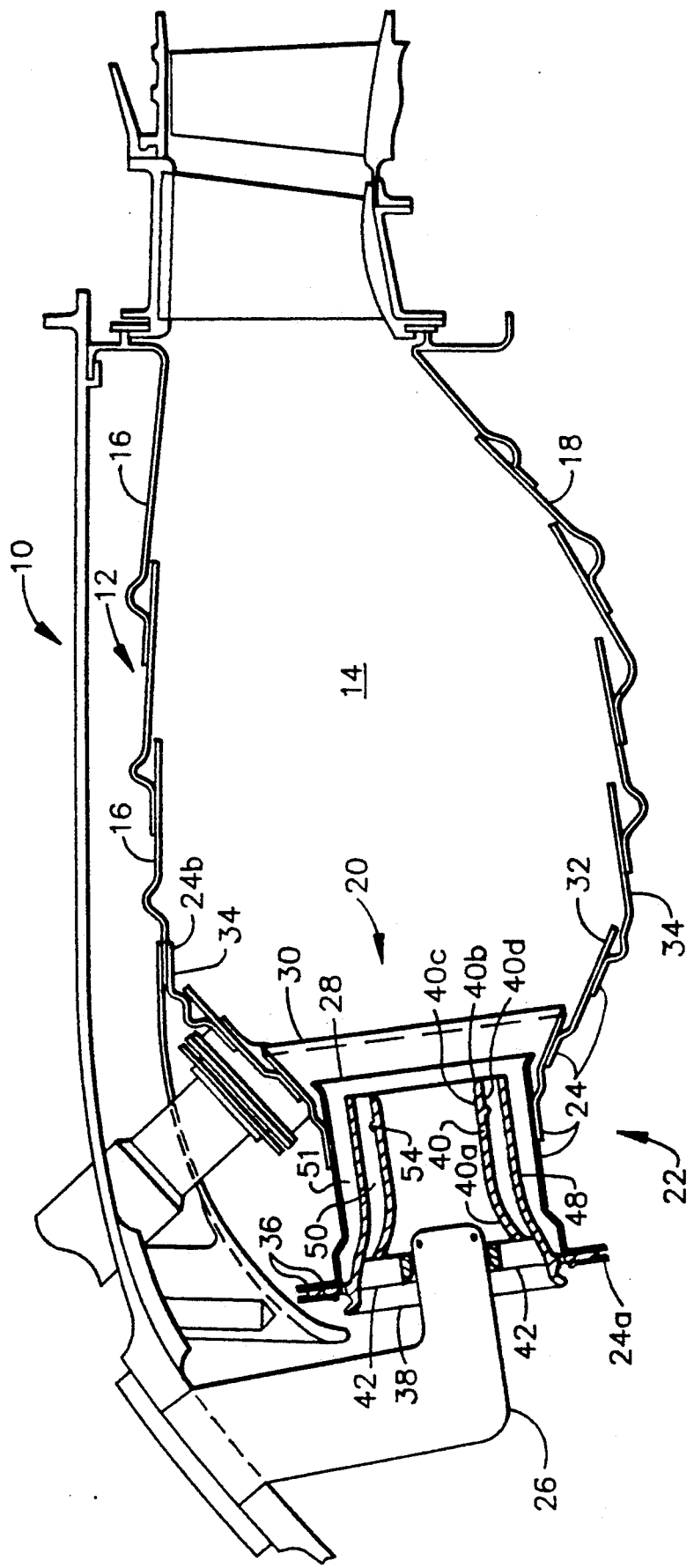
FIG. 1 is a longitudinal sectional view through a combustor apparatus.

FIG. 1 is a longitudinal sectional view, showing a continuous-burning combustor or combustion apparatus, hereinafter designated combustion apparatus 10, made according to the present invention. The combustion apparatus 10 is suitable for use in a gas turbine engine (not shown) and comprises a hollow body 12 which defines a combustion chamber 14 therein. Hollow body 12 is generally annular in form and is comprised of an outer liner 16, an inner liner 18, and a domed end 20. It should be understood, however, that this invention is not limited to such an annular configuration and may well be employed with equal effectiveness in other types of combustion apparatus, such as the well-known cylindrical can combustion apparatus.

In the present annular configuration, the domed end 20 of hollow body 12 comprises a combustor dome assembly 22. The combustor dome assembly 22 comprises a tubular section 24 having an inlet end 24a associated with a fuel nozzle 26 and an outlet end 24b which is coupled to the hollow body 12 by suitable means, such as a rivet, braze or weld. The tubular section 24 of the combustor dome assembly 22 comprises a swirl cup 28, trumpet 30, dome plate 32, and rivet band 34. The inlet end 24a of the tubular section 24 comprises a retainer 36 having a swirler 38 adjustably mounted therein.

Figure 2:
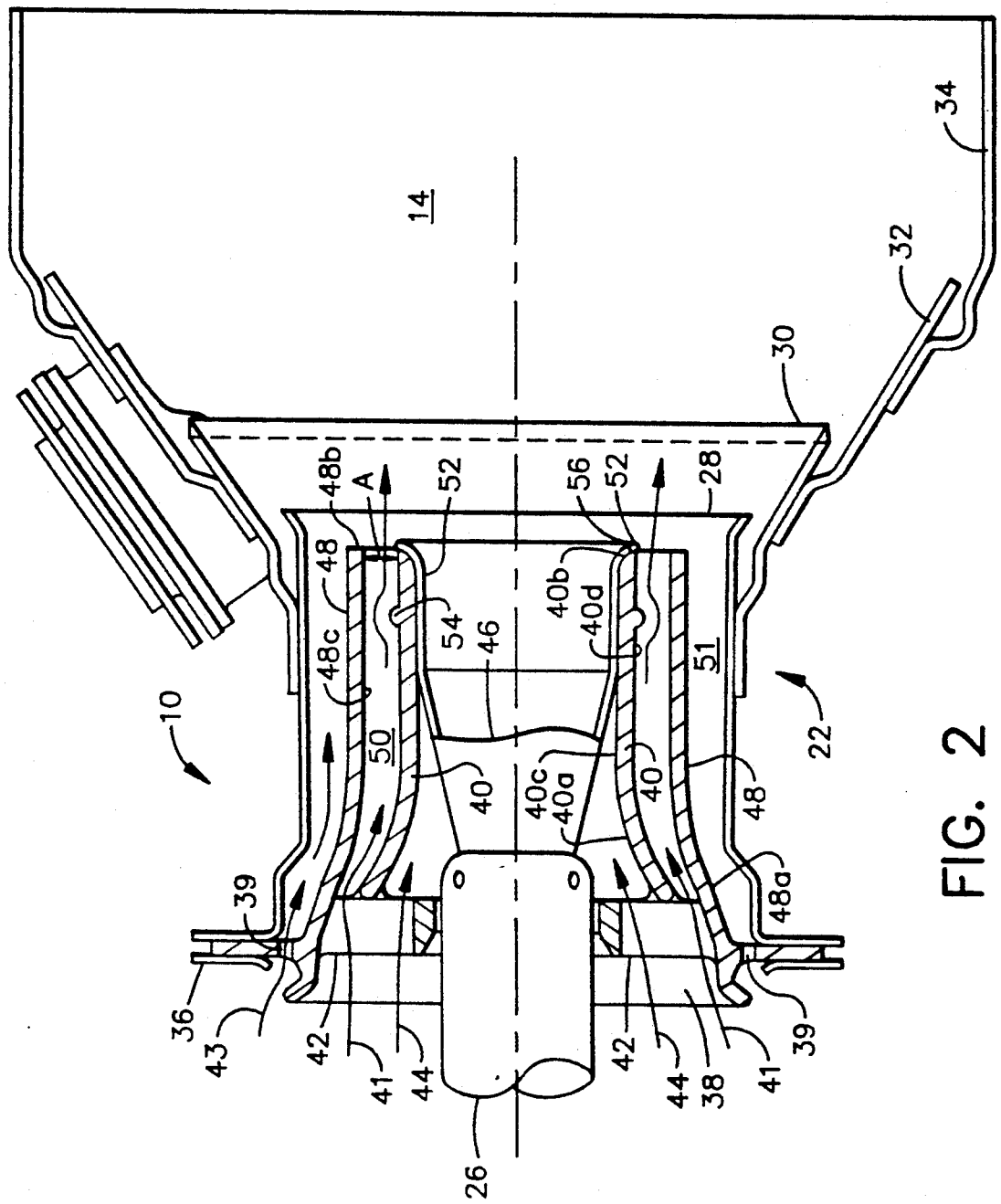
FIG. 2 is an enlarged longitudinal sectional view of a combustor dome assembly of the combustor apparatus shown in FIG. 1.

The combustor dome assembly 22 further comprises a venturi 40 having an upstream end 40a coupled to the swirler 38 and a downstream end 40b associated with the combustion chamber 14. As best shown in FIG. 2, the swirler 38 comprises a plurality of blades or vanes 42 which cause the air moving through swirler 38 to provide a swirling air jet 41 into an annular passage 50 around venturi 40, a swirling primary air jet 44 into venturi 40, and a non-swirling air jet 43 into a secondary passage 51 between swirl cup 28 and auxiliary wall 48. In the embodiment being described, the swirled air jet 41 has a velocity of approximately 340 ft./sec. at upstream end 40a and approximately 200 ft./sec. at downstream end 40b.

The swirler 38 is capable of receiving fuel nozzle 26 (FIGS. 1-4) through a supply or opening in the center of the swirler 38. The fuel nozzle supplies both fuel and water to combustor dome assembly 22 and to combustion chamber 14. Supplying both fuel and water to combustion chamber 14 has the advantage of permitting fuel to be ignited in combustion chamber 14 while the water reduces the temperature of the combustion, thereby reducing undesirable emissions, such as $NO_x$. FIG. 2 illustrates the injection of water and fuel into venturi 40 whereupon it is caused to swirl in a frusto-conical manner 46 by the swirling airflow provided by the swirler 38. As swirling water is forced against inner surface 40c under centrifugal force, it forms a thin film of water 52 along the inner surface 40c of venturi 40. The thin film of water 52 flows along the inner surface 40c towards downstream end 40b.

The combustor dome assembly 22 further comprises means associated with venturi 40 for atomizing water passing out of the downstream end 40b of venturi 40. In one embodiment of the invention, atomizing means comprises an auxiliary wall 48 (FIGS. 1, 2 and 3) which is tubular and has a first end 48a (FIG. 2) integrally formed as part of swirler 38. The auxiliary wall 48 lies intermediate venturi 40 and swirl cup 28 to define the annular passage 50 and the secondary passage 51 which were mentioned earlier herein. As best shown in FIG. 2, the annular passage 50 is concentric with venturi 40 and directs swirling air jet 41 along an outer surface 40d of venturi 40 towards downstream end 40b. The auxiliary wall 48 facilitates ensuring that the velocity of swirling air jet 41 at downstream end 40b of venturi 40 is substantially the same as at upstream end 40a. In the embodiment being described, venturi 40 is approximately 0.060 inch thick and auxiliary wall 48 is approximately 0.040 inch thick. The auxiliary wall 48 comprises an end 48b which may terminate substantially evenly with downstream end 40b of venturi 40. Notice that as the film of water 52 exits venturi 40 and is introduced to the high velocity air jet 41 at downstream end 40b, it becomes atomized into small particles before it can radially disperse and impact swirl cup 28, trumpet 30, dome plate 32, and rivet band 34 of tubular section 24.

In order to enhance the turbulence of the high velocity, swirling air jet 41, atomizing means further comprises radially outwardly extending peripheral protrusion and illustrated herein as a peripheral wire or flange 54, as best shown in FIG. 2. In the embodiment being described, the protrusion 54 is welded or brazed onto outer surface 40d of venturi 40 in operative relationship with downstream end 40b in order to create turbulence in air jet 41 at downstream end 40b. Although not shown, it should be understood that protrusion 54 could be welded or brazed onto an inner surface 48c of auxiliary wall 48.

In the embodiment being described, downstream end 40b (FIGS. 1 and 2) comprises a curved edge surface 56 which facilitates guiding the film of water 52 to turn radially outward from venturi 40 at an angle which is substantially perpendicular to high velocity air jet 41 as it passes downstream end 40b. In a physical phenomenon known as the Coanda Effect, a tendency exists for the film of water 52 to attach itself and follow the curved edge surface 56. The film of water 52 will follow the curved edge surface 56 until it is substantially perpendicular to the high velocity air jet 41 when it is introduced thereto. Furthermore, the swirling film of water 52 is directed radially outward by centrifugal force which also favors the water 52 following the curved edge surface 56 at the downstream end 40b. Advantageously, as the film of water 52 becomes introduced to the high velocity air jet 41, it becomes atomized into small particles, thereby further minimizing the erosion effects of water impingement upon the swirl cup 28, trumpet 30, dome plate 32, and rivet band 34.

Figure 3:
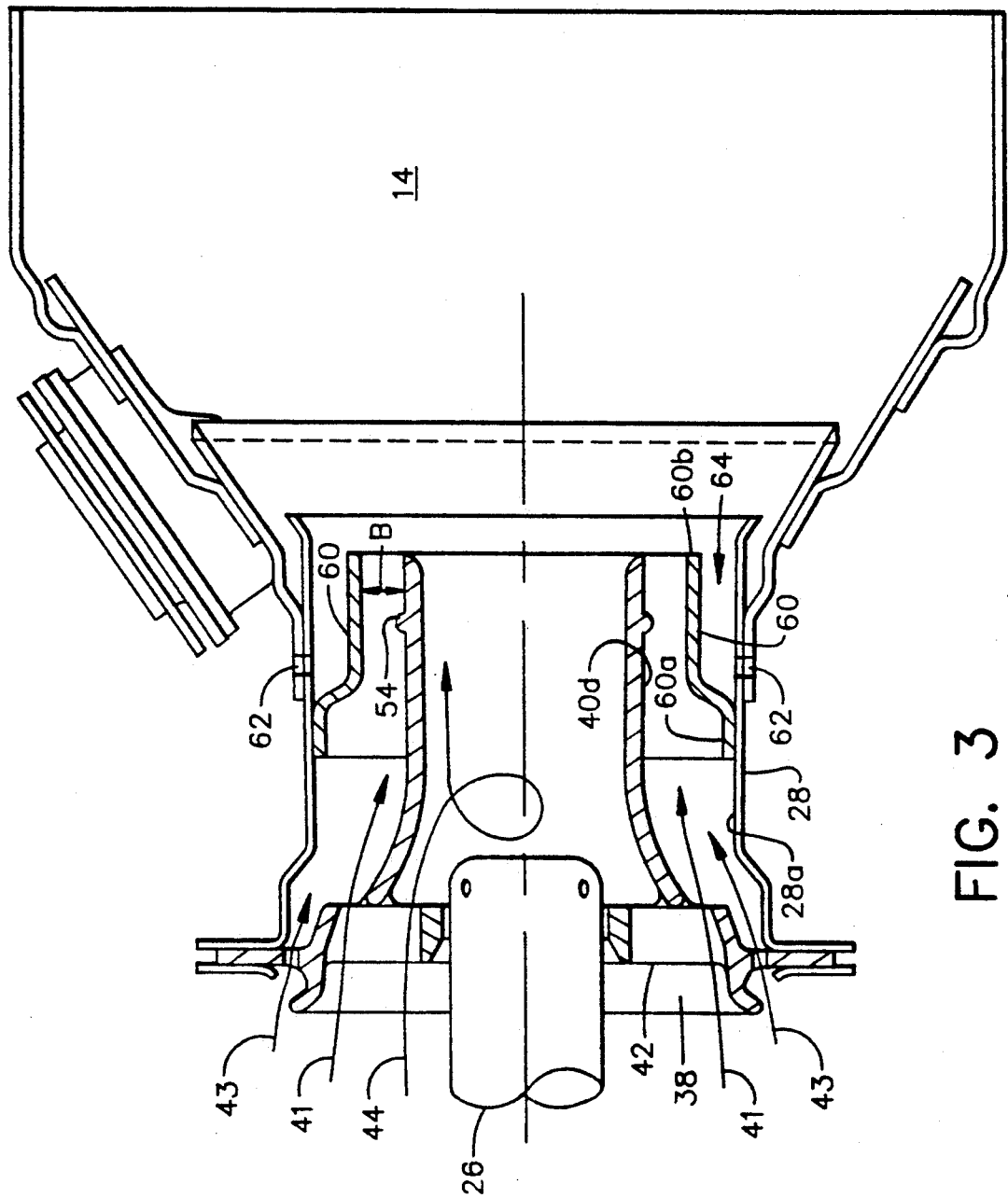
FIG. 3 is an enlarged longitudinal sectional view similar to that shown in FIG. 2, showing an alternate embodiment of the combustor dome assembly having a deflector.

In an alternate embodiment of the invention, atomizing means of combustor dome assembly 22 is illustrated in FIG. 3 as having a deflector 60. Deflector 60 has an end 60a which is welded or brazed to an inner surface 28a of swirl cup 28 for directing swirled air from swirler 38 towards downstream end 40b of venturi 40. A function of deflector 60 is to direct or force swirling air jet 41 and non-swirling air jet 43 (which becomes swirled when it is introduced to swirling air jet 41) against outer surface 40d of venturi 40 in order to enhance the velocity of the air jets 41 and 43 as it passes end 40b. A plurality of purge holes 62 may be provided to purge or vent annular space 64 between deflector 60 and inner surface 28a of swirl cup 28. The deflector 60 comprises an end 60b which terminates substantially evenly with downstream end 40b of venturi 40. Although not shown, it may be desirable to extend end 60b of deflector 60 or end 48b of auxiliary wall 48 in the embodiments shown in FIGS. 2 and 3, respectively, past downstream end 40b of venturi 40. This facilitates reducing the angle of dispersion of the film of water 52 as it exits venturi 40 which, in turn, enhances atomization of the film of water 52.

It should also be appreciated that radial dimension A in FIG. 2 and radial dimension B in FIG. 3 may be increased or decreased in order to achieve the desired amount of air speed velocity at the downstream end 40b. In the embodiments being described, radial dimension A (FIG. 2) is between 0.08 inch and 0.14 inch, and radial dimension B (FIG. 3) lies between 0.10 inch and 0.25 inch.

Figure 4:
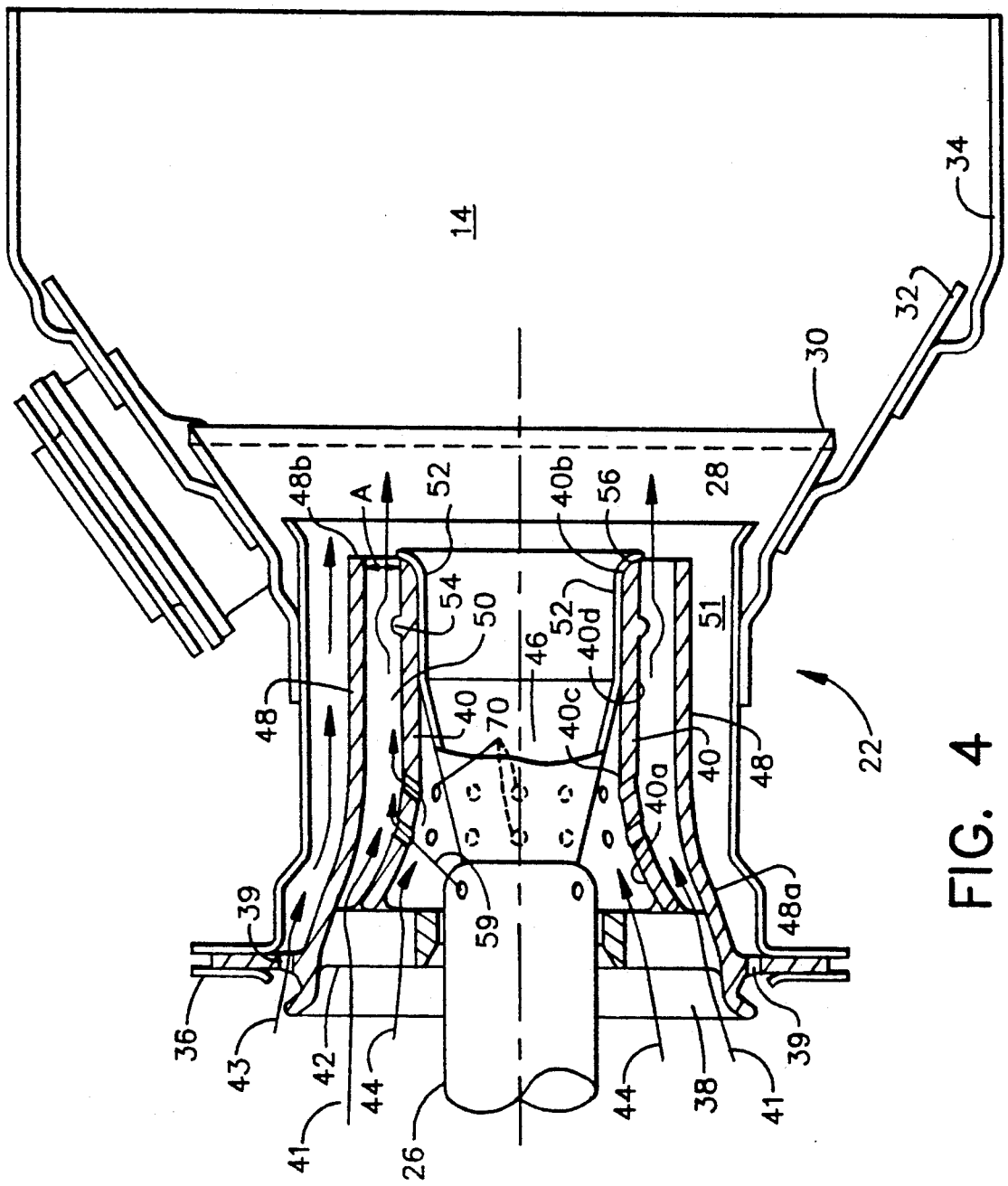
FIG. 4 is an enlarged longitudinal sectional view, similar to that shown in FIG. 2, showing a plurality of apertures or holes in a venturi in the combustor dome assembly.

FIG. 4 shows another embodiment of this invention in which a plurality of holes 70 are provided in upstream end 40a of venturi 40 to facilitate mixing natural gas 59 from fuel nozzle 26 with swirling air jet 41 in annular passage 50. The plurality of holes 70 permit natural gas 59 from fuel nozzle 26 to pass through venturi 40 and into annular passage 50. Although not shown, some or all of the plurality of holes 70 could be located closer to the downstream end 40b in order to permit both natural gas and water to pass into annular passage 50. The natural gas 59 mixes with the swirling air jet 41 in annular passage 50 to provide a swirling mixture of gas and air which is subsequently directed to combustion chamber 14. Premixing the air and fuel in the manner shown facilitates reducing CO and $NO_x$ emissions. This feature may be further enhanced by providing a fuel nozzle (not shown) which supplies a premixture of fuel and steam.

Advantageously, this invention provides an apparatus and method for inhibiting water erosion damage to the tubular section 24 of a combustor dome assembly 22 in a gas turbine engine. A swirling charge of fuel and water is projected through venturi 40 toward combustion chamber 14, thereby causing the film, of water 52 to travel along inner surface 40c towards downstream end 40b of venturi 40. The film of water 52 is atomized by enhancing the velocity of the swirling air jet 41 around the outer surface 40d of venturi 40 and directing the enhanced, high velocity swirling air jet 41 towards downstream end 40b. In the preferred embodiment, the high velocity swirling air jet 41 is directed towards downstream end 40b using auxiliary wall 48 (FIG. 2) as described above. Alternatively, deflector 60 (FIG. 3) could be used to direct air jet 41 and non-swirling air jet 43 towards downstream end 40b. As mentioned previously herein, the turbulence of swirling air jet 41 at downstream end 40b of venturi 40 may be enhanced by interrupting air jet 41 with protrusion 54 which is positioned in operative relationship to downstream end 40b. The curved edge surface 56 permits film of water 52 to turn smoothly about downstream end 40b into substantially perpendicular relation to the air flow at downstream end 40b. As the film of water 52 is introduced to swirling air jet 41, it becomes atomized before it radially disperses into contact with swirl cup 28, trumpet 30, dome plate 32, rivet band 34 and other components of combustor dome assembly 22, thereby reducing erosion and the undesirable effects of water impingement.

Various changes or modifications in the invention described may occur to those skilled in the art without departing from the spirit or scope of the invention. The above description of the invention is intended to be illustrative and not limiting, and it is not intended that the invention be restricted thereto but that it be limited only by the true spirit and scope of the appended claims.

We claim:

1. A combustor dome assembly for use in a combustion apparatus having at least one combustion chamber, comprising:
   (a) a tubular section having an inlet end and an outlet end;
   (b) a swirler mounted to said inlet end of said tubular section;
   (c) a venturi having an upstream end coupled to said swirler and a downstream end;
   (d) a supply passage adjacent to said upstream end of end of said venturi for introducing fuel and water into said venturi, and said venturi including an inner surface for receiving water which is introduced through said supply passage and which is caused to move outwardly toward said inner surface by air introduced into said venturi through said swirler; and
   (e) atomizing means including an auxiliary tubular well coupled to said swirler, and an annular passage located between and defined by said tubular wall and said venturi for directing air towards said downstream end of said venturi, said atomizing means further including a curved edge surface curving radially outwardly from said inner surface at said downstream end of said venturi, said curved edge surface terminating directly adjacent to said annular passage to direct any water received by said inner surface and flowing along said curved edge surface into contact with air flowing out of said annular passage whereby the water will be atomized.

2. The combustor dome assembly of claim 1, wherein said auxiliary tubular wall is concentric with said venturi and said swirler causes air flowing through said annular passage to swirl along an outer surface of said venturi towards said downstream end of said venturi.

3. The combustor dome assembly of claim 1, wherein said atomizing means comprises a deflector coupled to an inner surface of said tubular section for directing swirled air from said swirler towards said downstream end of said venturi.

4. The combustor dome assembly of claim 1, wherein said annular passage has a radial dimension between 0.08 and 0.14 inch.

5. The combustor dome assembly of claim 1, wherein said atomizing means comprises a peripheral protrusion located on an outer surface of said downstream end of said venturi, said protrusion protruding into said annular passage in order to create turbulence in air flowing past said downstream end of said venturi.

6. The combustor dome assembly of claim 2, wherein said atomizing means comprises a peripheral protrusion located on the outer surface of said downstream end of said venturi, said protrusion protruding into said annular passage in order to create turbulence in air flowing through said annular passage and past said downstream end of said venturi.

7. The combustor dome assembly of claim 1, wherein said curved edge surface guides water flowing along said inner surface of said venturi to turn radially outward from said venturi at an angle which is substantially perpendicular to the flow of air passing through said annular passage toward said downstream end of said venturi.

8. The combustor dome assembly of claim 6, wherein said curved edge surface guides water flowing along said inner surface of said venturi to turn radially outward from said venturi at an angle which is substantially perpendicular to the flow of air passing through said annular passage.

9. The combustion dome assembly of claim 1, wherein said venturi comprises a plurality of holes located in the upstream end of said venturi to permit fuel to pass from within the venturi into said annular passage.

10. A combustion apparatus for a gas turbine engine, comprising:
   (a) a body defining at least one combustion chamber;
   (b) a swirl cup assembly for providing a swirled mixture of water, fuel and air to said at least one combustion chamber, said swirl cup assembly comprising a tubular section, a swirler having a supply passage for introducing fuel and water to said swirl cup assembly, and also comprising a venturi having an upstream end coupled to said swirler and a downstream end adjacent to said at least one combustion chamber, said venturi including an inner surface for receiving water which is introduced through said supply passage and which is caused to move radially outwardly toward said inner surface by air introduced into said venturi through said swirler; and (c) atomizing means including an auxiliary tubular well coupled to said swirler, and an annular passage located between and defined by said tubular wall and said venturi for directing air towards said downstream end of said venturi, said atomizing means further including a curved edge surface curving radially outwardly from said inner surface at said downstream end of said venturi, said curved edge surface terminating directly adjacent to said annular passage to direct any water received by said inner surface and flowing along said curved edge surface into contact with air flowing out of said annular passage whereby the water will be atomized.

11. The combustion apparatus of claim 10, wherein said auxiliary tubular wall is concentric with said venturi and said swirler causes air flowing through said annular passage to swirl along an outer surface of said venturi towards said downstream end of said venturi.

12. The combustion apparatus of claim 10, wherein said tubular section comprises a swirl cup, said atomizing means comprising a deflector coupled to an inner surface of said swirl cup for directing swirled air from said swirler towards said downstream end of said venturi.

13. The combustor apparatus of claim 10, wherein said atomizing means comprises a peripheral protrusion located on the outer surface of said downstream end of said venturi, said protrusion protruding into said annular passage in order to create turbulence in air flowing through said annular passage and past said downstream end of said venturi.

14. The combustion apparatus of claim 10, wherein said curved edge surface guides water flowing along said inner surface of said venturi to turn radially outward from said venturi at an angle which is substantially perpendicular to air flowing through said annular passage and past said downstream end of said venturi.

15. The combustion apparatus of claim 10 wherein said venturi comprises a plurality of holes located in the upstream end of said venturi to permit fuel to pass from within the venturi into said annular passage.

* * * * *